United States Patent
Brandt

[19]

[11] Patent Number: 5,926,013
[45] Date of Patent: Jul. 20, 1999

[54] CIRCUIT AND METHOD FOR GENERATING A VOLTAGE FOR USE DURING ACTIVE TIME PERIODS BUT NOT INACTIVE TIME PERIODS

[75] Inventor: Per-Olof Magnus Brandt, Staffanstorp, Sweden

[73] Assignee: Telefonaktiebolaget LM Ericsson, Stockholm, Sweden

[21] Appl. No.: 09/018,536

[22] Filed: Feb. 4, 1998

[30] Foreign Application Priority Data

Feb. 5, 1997 [SE] Sweden .................................. 9700400

[51] Int. Cl.⁶ ........................................................ H03H 1/00
[52] U.S. Cl. ............................................ 323/370; 307/108
[58] Field of Search ................................. 323/210, 370; 307/108, 109

[56] References Cited

U.S. PATENT DOCUMENTS

| | | | |
|---|---|---|---|
| 4,184,197 | 1/1980 | Cuk et al. ................................ | 363/16 |
| 4,355,352 | 10/1982 | Bloom et al. ............................. | 363/16 |
| 4,636,930 | 1/1987 | Bingham et al. ......................... | 363/60 |
| 5,396,165 | 3/1995 | Hwang et al. ........................... | 323/210 |

FOREIGN PATENT DOCUMENTS

| | | |
|---|---|---|
| 0654911A2 | 5/1995 | European Pat. Off. . |
| 2023949 | 1/1980 | United Kingdom . |

*Primary Examiner*—Shawn Riley
*Attorney, Agent, or Firm*—Burns, Doane, Swecker & Mathis, L.L.P.

[57] ABSTRACT

A circuit for generating an output voltage which is used during active time periods and not during inactive time periods. A DC/DC converter converts an input voltage to the output voltage. During the inactive time periods, a capacitor is charged with a quantity of charge which is then used to generate the output voltage during the active time periods. The quantity of charge is generated by a current from a current generator. The current is lead to the ground via the capacitor and a diode. As the capacitor is charged more and more, the current diminishes to zero. A control voltage switches the circuit during the active time periods so that the output voltage is obtained. The circuit can be used in a radio transmitter for portable radio equipment, in which the radio equipment is used in a radio system where transmissions occur in bursts.

12 Claims, 4 Drawing Sheets

CIRCUIT AND METHOD FOR GENERATING A VOLTAGE FOR USE DURING ACTIVE TIME PERIODS BUT NOT INACTIVE TIME PERIODS

TECHNICAL FIELD

The present invention relates to a circuit and a method for generating a voltage. The voltage is used during active time periods and is not used during inactive time periods.

The invention also relates to the use of the circuit in a radio transmitter comprised in a portable radio equipment.

STATE OF THE ART

In certain applications it is necessary to be able to generate a voltage with special characteristics. One such application can be when the voltage is only required during certain periods of time. The time when the voltage is required can be called an active time period and the time when the voltage is not required can be called an inactive time period.

An example can be when the voltage is generated in order to be used as e.g. the supply voltage to a circuit which is not driven continuously. The supply voltage should be supplied to the circuit during the active time periods and during, the inactive time periods not be supplied to the circuit.

An example which can be mentioned is a radio transmitter comprised in a portable radio equipment where the radio equipment is used in a radio system where transmissions occur in bursts. A negative supply voltage to the power amplifier of the radio transmitter is required in this case during, every burst transmission.

The expression portable radio equipment comprises all portable equipment which is arranged for radio communication, such as for example mobile telephones, pagers, telefax and printer devices and communicators, i.e. telephones with computers and built-in calendars. Said equipment can be used in some type of radio network such as for example cellular networks, satellite networks or smaller local networks.

It is known to use a so called charge-pump in order to produce voltages with the above described features.

An example of this is described in a patent application GB 2,023,949. In the said application a negative supply voltage is produced by a circuit which comprises an operational amplifier, a buffer amplifier and a diode pump amplifier. The operational amplifier controls the buffer amplifier so that it is alternately "on" and "off" which results in that a charge is pumped into a condenser in the diode pump amplifier and that a negative voltage is obtained.

A disadvantage with the construction according to the said prior art is the use of the operational amplifier and the diode pump amplifier, because the oscillator frequency of the operational amplifier can lie like a ripple on the voltage produced. In order to avoid said ripple extra components are required, e.g. a filter, and despite this it can be difficult to keep the ripple sufficiently low which is well known to the person skilled in the art.

When an oscillator is used the problem of how to obtain a quick and well defined start-up time is also present.

Yet another disadvantage in the construction according to the prior art is that the voltage is produced continuously, i.e. even when it is not required, as the charge is supplied to the condenser all the time.

DISCLOSURE OF THE INVENTION

The present invention tackles the problem of how an voltage alternatingly can be produced in a simple manner.

Another problem is how the voltage can be produced without a ripple arising on the voltage produced.

Yet another problem is how quick and well-defined transit times can be obtained. Yet another problem is how the voltage can be produced only during the time periods when it is required.

An object with the present invention is consequently to tackle the above problems.

Yet another object is to provide a simple and cheap circuit for producing the voltage.

A solution according to the invention is to charge up a condenser during the time when the voltage is not required. When the voltage is required the condenser is discharged whereby a voltage is obtained.

The solution comprises a control voltage and an input voltage connected to the circuit. The control voltage switches the circuit between active and inactive time periods. A DC/DC-converter converts the input voltage to the desired output voltage during the active time periods. The output voltage is produced by means of a quantity of charge which is stored in a storage means whereby the storage means is charged up with the quantity of charge during the inactive time periods. The quantity of charge is generated by a current which is produced by a current generator.

The present invention has several advantages. A voltage can alternatingly be produced in a simple manner wherein the voltage can be produced without ripples arising on the voltage produced.

Another advantage is that quick and well defined transit times are obtained and that the voltage is produced only during the time periods when it is required to be used.

Yet another advantage is that a simple and cheap circuit for the production of the voltage is obtained with the invention.

The invention will now be described more closely with the help of preferred embodiments and with reference to the accompanying drawings.

PREFERRED EMBODIMENTS

Figure 1A:
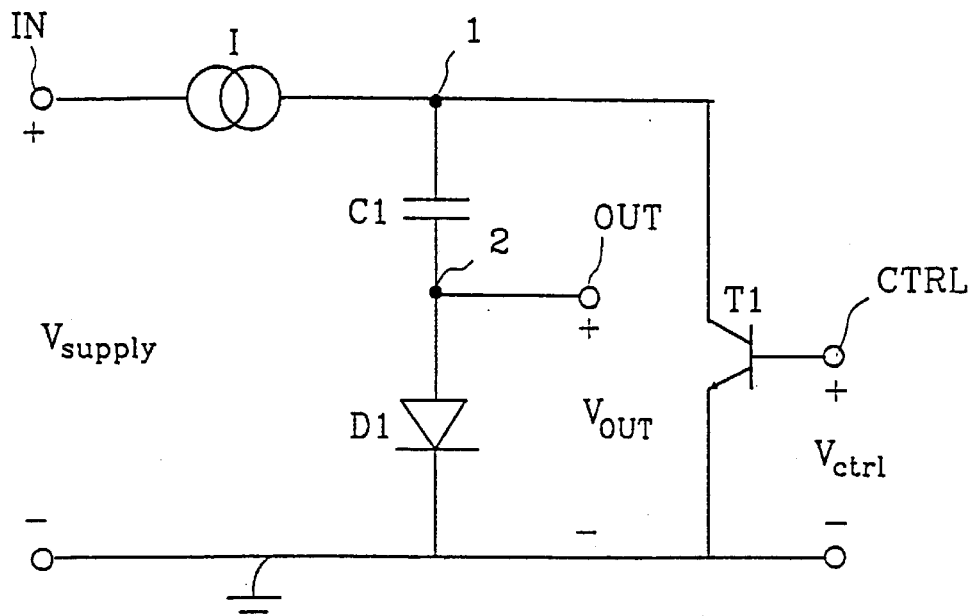
FIG. 1a shows a circuit for the production of a voltage and illustrates the principle according to the invention.

In FIG. 1a a circuit for generating a voltage is shown. The circuit is schematic and illustrates the principle for the invention. A current generator I is connected in series with a parallel connection comprising a first branch which comprises a condenser C1 in series with a diode D1 and a second branch which comprises a transistor T1, wherein the condenser C1 and the diode D1 are connected in parallel with the transistor T1.

A supply voltage $V_{supply}$ is supplied to the circuit via an input IN. A control voltage $V_{ctrl}$ is supplied to the transistor T1 via a control input CTRL. The control voltage can be characterised by a certain frequency and a certain duty cycle. The duty cycle can e.g. be 1:8.

An output voltage $V_{OUt}$ is obtained at an output OUT as will be explained below. The output voltage is used during the active time periods and not used during the inactive time periods.

Assume first that the circuit is in an inactive time period. According to the invention the control voltage $V_{ctrl}$ is then low whereby the transistor T1 is cut off. A current will be generated by the current generator I in order to be subsequently lead to earth through the condenser C1 and the diode D1. The condenser will be charged up more and more during which the current successively diminishes to zero when the condenser is fully charged.

In this way the condenser will function as a storage means for the quantity of charge which is built up in the condenser.

Assume now that the inactive time period changes to an active time period. When this takes place the condenser C1 is fully charged. The transition or the switching over between the inactive and active time periods is determined by the control voltage $V_{ctrl}$. During switching over a high control voltage $V_{ctrl}$ is applied via the control input CTRL. In this way the transistor T1 will become fully conducting and the potential at the point 1 in the current generator I and the condenser C1 will be 0 V. At the same time the potential at point 2 will go from x V (the voltage drop over the diode D1) to $-(V_{supply}-x)$ V, wherein the output voltage $V_{out}$ will also have the value $-(V_{supply}-x)$ V.

The value of x is dependent on which type of diode is used. For example the value can be 0.3 V for a Schottky diode or 0.7 V for a PN-diode. In the following description it is assumed that the diode is a PN-diode, wherein x is approximately equal to 0.7 V.

During the active time period the condenser C1 will be successively emptied of the quantity of charge which is supplied during the inactive time period. The charge is lead to earth through the transistor T1 and $V_{out}$ takes the value $-(V_{supply}-x)$ V as explained above.

When the active time period is over the control voltage $V_{ctrl}$ again takes a low value whereby the transistor T1 is cut off and the condenser begins to charge up again. When the control voltage is low it is the current generator I which supplies the current which is required in order to charge the condenser C1.

Figure 1B:
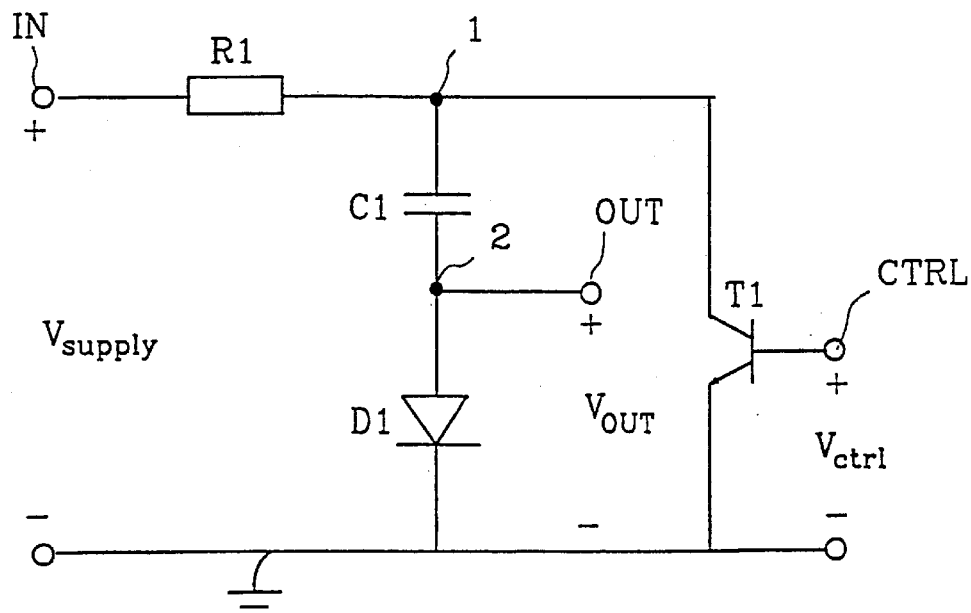
FIG. 1b shows an embodiment of the circuit according to the invention.

The current generator I in FIG. 1a can be produced in different ways. One way is to connect a resistor R1 between the input IN and the point 1 as shown in FIG. 1b. Generally it can then be said that the supply voltage $V_{supply}$ which is supplied to the input IN and the resistor R1 form the current generator I in FIG. 1a. The charge time is determined by the RC-constant of the resistor R1 and the condenser C1.

Figure 1C:
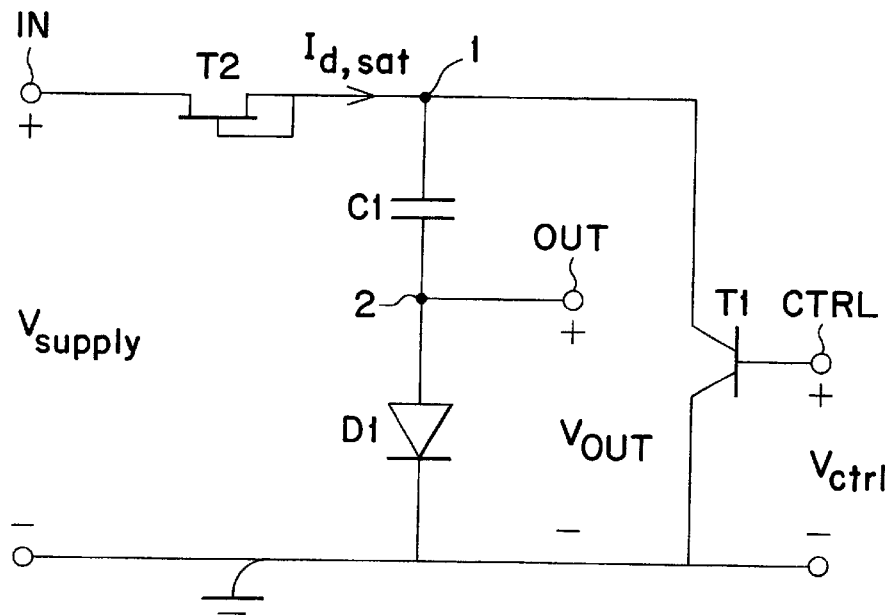
FIG. 1c shows another embodiment of the circuit according to the invention.

Another way of producing the current generator I is shown in FIG. 1c. A MESFET-transistor T2 is connected between the input IN and the point 1. The drain connection of the transistor T2 is connected to the input IN, the source connection is connected to the point 1 and the gate connection is connected together with the source connection. In this way a saturated current $I_{d,sat}$ is obtained which can be used for charging the condenser C1 as explained above.

The MESFET-transistor T2 limits the current during the active time periods. During the inactive time periods when the condenser is nearly fully loaded the transistor T2 functions as a low resistance.

If the output voltage from the circuit according to the invention is used as the supply voltage to, for example, a power amplifier, which is manufactured by an MESFET-process, a simple solution is obtained with the help of the MESFET-transistor T2. The MESFET-transistor T2 can in this case be integrated in the same manufacturing process as the power amplifier and placed on the same chip as the power amplifier. The diode D1 can also be manufactured in an MESFET-process and integrated on the same chip as the power amplifier and the transistor.

Figure 2:
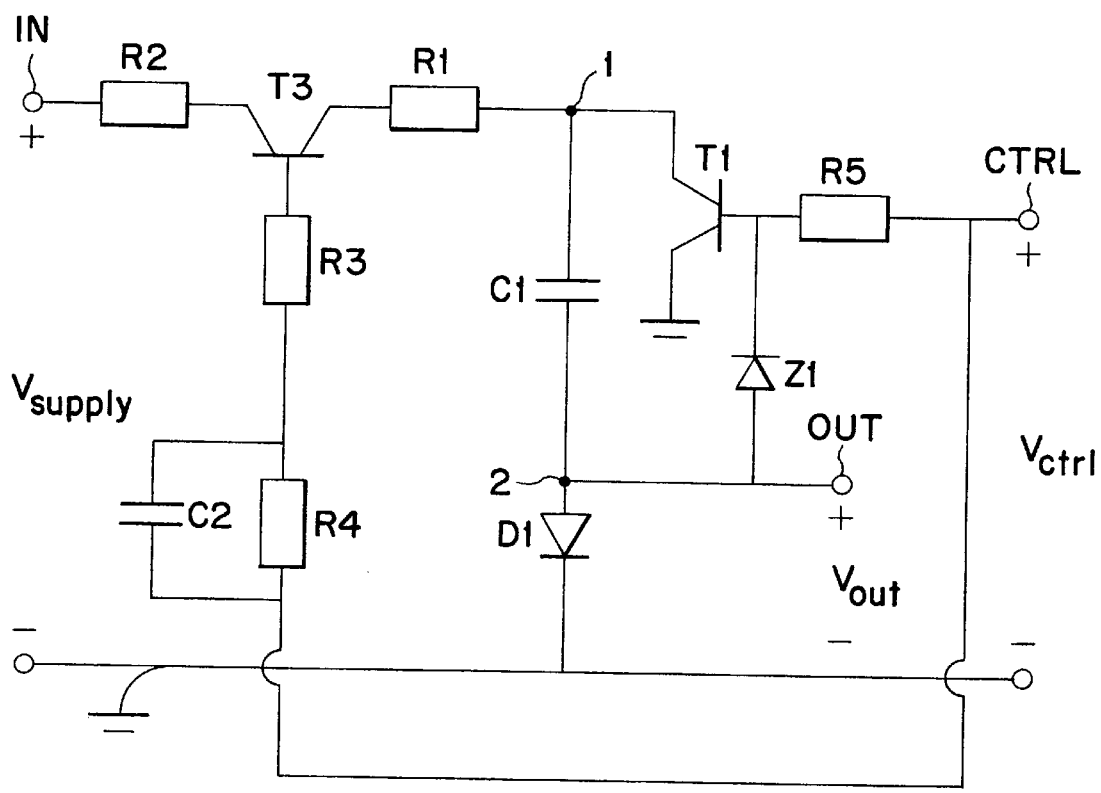
FIG. 2 shows a further embodiment of a circuit according to the invention.

FIG. 2 shows another embodiment of the invention. The current generator I, which is shown generally in FIG. 1a, comprises in this embodiment the resistors R1, R2, R3 and R4, the condenser C2 and the transistor T3. The transistor T3 is used in order to produce a on/off function of the current generator.

During the inactive time periods the transistor T3 is fully conducting and the current generator consequently supplies current in order to charge up the condenser C1. During the active time periods the transistor T3 is cut off whereby no current is supplied. The resistors R3 and R4 are used in order to obtain the desired value of the gate current to transistor T3. With the help of the condenser C2 it is ensured that the transistor T3 switches on and off with the help of the control voltage $V_{ctrl}$. The resistor R2 functions as a safety resistance in order to limit the current which can pass through the transistor T3.

The DC/DC-converter which is shown generally in FIGS. 1a–1c comprises in this embodiment also the resistor R5 and the Zener diode Z1.

The resistor R5 can be used in order to provide a possibility of varying the bass voltage on the transistor T1.

The diode Z1 can be used to avoid variations in the output voltage $V_{out}$ when the output OUT is loaded with a load, e.g. a power amplifier. According to the invention the Zener diode is to be connected between the control input of the transistor T1 and point 2 as is shown in the Figure, whereby it stabilises voltages less than the Zener voltage minus the voltage drop across the diode D1. If for example the Zener voltage is 4.8 V and the diode voltage 0.7 V, then the output voltage can never be less than −4.1 V. In this way a voltage stabilising function is obtained in the circuit according to the invention. The transistor T1 and the diode D1 can generally be said to form a DC/DC-converter which it is possible to switch between two states, an active state and an inactive state and the condenser C1 can generally be said to be a storage means, in which a quantity of charge is stored in order to be used for generating an output voltage $V_{out}$ during the active time periods.

When the switching takes place between the active and the inactive time periods a changing of the polarity at point 2 occurs. During the inactive time periods the polarity is positive at point 2 but during the active time periods the polarity is negative. For this reason the output voltage $V_{out}$ also becomes a negative output voltage.

Figure 3A:
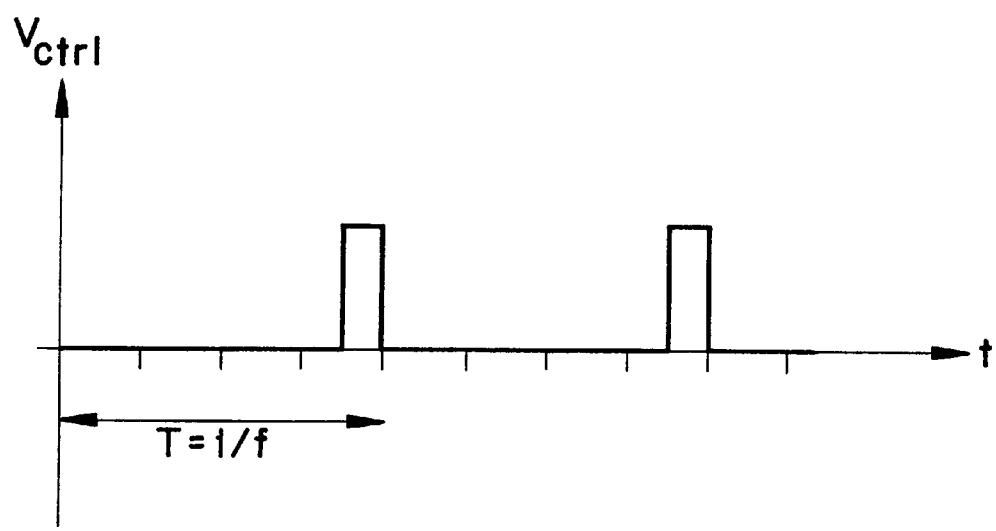
FIG. 3 shows the control voltage and the output voltage from the circuit according to the invention as a function of time.
Figure 3B:
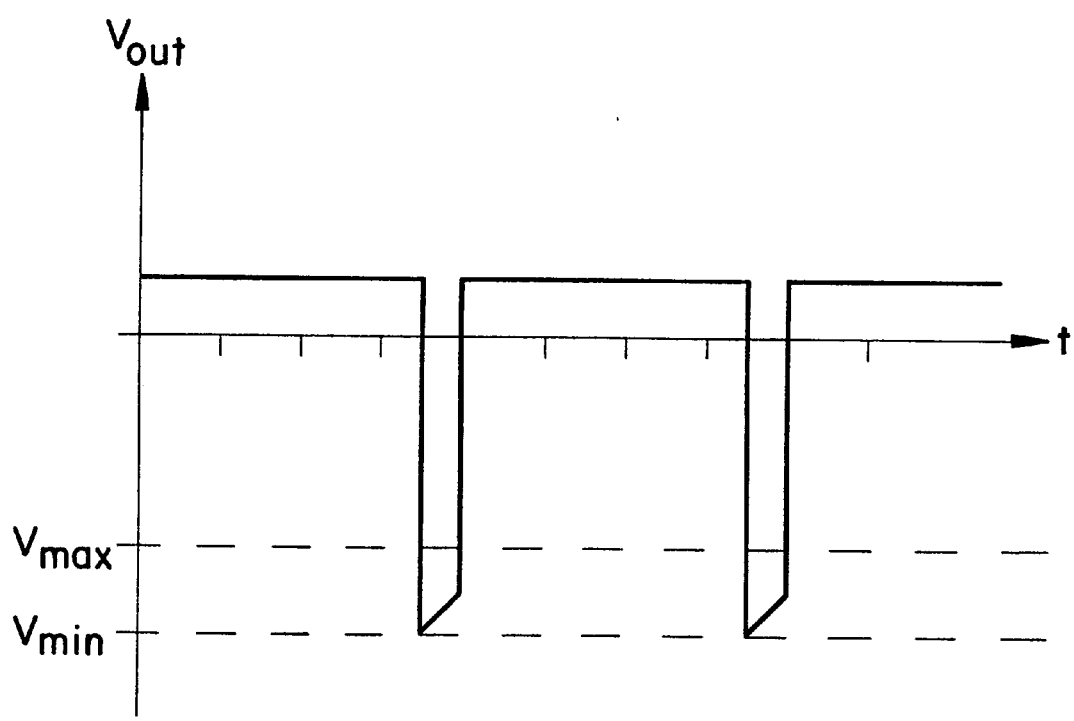

FIG. 3 shows the control voltage $V_{ctrl}$ and the output voltage $V_{out}$ from the circuit according to the invention as a function of time t.

The control voltage can be characterised by a certain frequency f and a certain duty cycle. The duty cycle can e.g. be 1:8, which means that the control voltage is high one eighth of the period of time T.

Assume that the condenser C1 is completely discharged at time t=0. The control voltage $V_{ctrl}$ is low, whereby the condenser charges up during the first seven eighths of the time period T. The output voltage $V_{out}$ is equal to the voltage across the diode D1, which is approximately equal to 0.7 V if the diode is for example a PN-diode.

During the last one eighth of the time period T the control voltage is high, whereby a polarity reversal occurs at point 2 as explained with reference to FIGS. 1a–1c. When this takes place the condenser is fully charged. The output voltage $V_{out}$ is now equal to $-(V_{supply}-0.7)$ V. The output voltage will be held by the charge which is stored in the condenser C1. The charge is lead to earth through the transistor T1. The voltage will rise somewhat during the active time period but through a suitable dimensioning of the constituent components in the circuit this variation can be held within specified values $V_{min}$ and $V_{max}$. A Zener diode can also be connected as described with reference to FIG. 2 in order to produce a voltage stabilised function.

Figure 4:
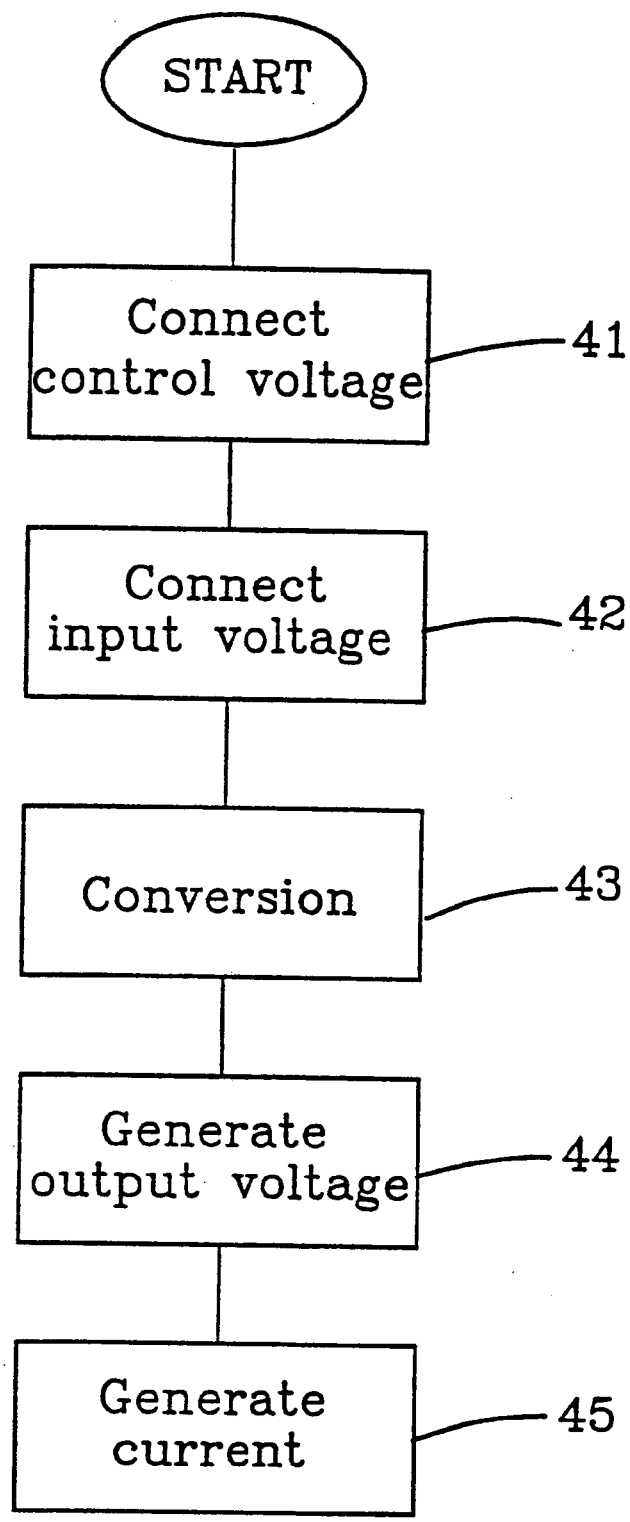
FIG. 4 shows a schematic flow diagram of a method for the production of a voltage according to the invention.

FIG. 4 shows a schematic flow diagram of a method for generating the output voltage ($V_{out}$), which output voltage is used during the active time periods and which output voltage is not used during the inactive time periods as described above.

In stage 41 a control voltage $V_{ctrl}$ is connected to the circuit according to the invention, which control voltage switches between the active and the inactive time periods.

In stage 42 an input voltage $V_{supply}$ is connected to the circuit.

In stage 43 the input voltage $V_{supply}$ is converted to the output voltage $V_{out}$ by means of a DC/DC-converter T1, D1.

In stage 44 the output voltage $V_{out}$ is generated which comprises the charging up of a storage means C1 with a quantity of charge during the inactive time periods, which quantity of charge produces the output voltage $V_{out}$ during the active time periods.

Stage 44 comprises also that the DC/DC-converter is switched from the inactive state to the active state depending on the control voltage $V_{ctrl}$, whereby the output voltage $V_{out}$ is obtained as the voltage between a point 2, between the condenser C1 and the diode D1, and earth, whereby the potential at point 2 takes the value –(input voltage $V_{supply}$ –((voltage drop across the diode D1)) Volts.

In stage 45 a current is produced by means of a current generator I which current generates the quantity of charge which charges up said storage means C1.

The invention is naturally not limited to the above described embodiments shown in the drawings but can be modified within the scope of the accompanying claims.

What is claimed is:

1. Circuit for the generation of an output voltage for use during active time periods but not during inactive time periods, the circuit comprising:

means for connecting a control voltage to the circuit, for switching between the active and the inactive time periods, means for connecting an input voltage to the circuit, a DC/DC-converter for converting the input voltage into the output voltage including a diode and a first transistor and storage means, wherein said storage means comprises a first condenser and is charged with a quantity of charge during the inactive time periods, for generating the output voltage during the active time periods, a current generator for generating a current, for generating the quantity of charge which charges said storage means, said current generator comprising a first resistor, wherein said current generator is connected in series with a parallel connection comprising a first branch which comprises the storage means in series with said diode and a second branch which includes said first transistor, wherein said storage means and said diode are connected in parallel with said first transistor.

2. Circuit according to claim 1, wherein said means for generating the output voltage further comprises the diode and the first resistor, which resistor is connected to the first condenser so that an RC-circuit is obtained.

3. Circuit according to claim 1, wherein the current generator comprises a second transistor, which has a drain-connection connected to said means for connection of the input voltage, a source-connection connected to said parallel connection, and a gate-connection connected together with the source-connection, whereby a saturation current is obtained for charging the first condenser.

4. Circuit according to claim 1, wherein the current generator further comprises a second resistor, a third resistor and a fourth resistor, a second condenser and a third transistor, wherein the third transistor's collector connection, via the first resistor, is connected to said parallel connection, wherein the third transistor's emitter connection, via the second resistor, is connected to said means for connection of the input voltage, and wherein the third transistor's base connection, via the third and fourth resistors are connected to said means for connection of the control voltage, wherein the second condenser is connected in parallel with the fourth resistor.

5. Circuit according to claim 1, further comprising an additional resistor and a Zener diode, wherein the Zener diode is connected to a point between the diode and the first condenser and to the base connection of the first transistor, and wherein the additional resistor is connected to the first transistor's base connection and to said means for connection of the control voltage.

6. Circuit according to claim 1, wherein the DC/DC-converter is switchable between an active state and an inactive state depending on the control voltage.

7. Circuit according to claim 1, wherein the control voltage is supplied to the first transistor at a control input.

8. Circuit according to claim 1, wherein the output voltage is obtained as the voltage between a point, between the first condenser and the diode, with respect to ground, wherein the potential at the point has the value –(input voltage–((voltage drop across the diode))) V.

9. Use of the circuit according to claim 1, in a radio transmitter comprised in a portable radio equipment, where the radio equipment is used in a radio system where the transmissions occur in bursts, wherein the output voltage is used as the supply voltage to the power amplifier of the radio transmitter.

10. Method for the generation of an output voltage, which output voltage is used during an active time period and which output voltage is not used during an inactive time period, which method comprises:

connecting a control voltage to the circuit, which control voltage switches between the active and inactive time periods, connecting an input voltage to the circuit, converting of the input voltage to the output voltage by means of a DC/DC-converter including a diode, charging of storage means with a quantity of charge during the inactive time periods, which quantity of charge generates the output voltage during the active time periods, said diode and said storage means being connected in series, generating a current by means of a current generator, which current generates the quantity of charge which charges up said storage means, wherein the generation of the output voltage during the active time periods includes the switching of the DC/DC-converter from the inactive state to the active state depending on the control voltage, wherein the output voltage is obtained as the voltage at a point between said storage means and said diode, with respect to ground, wherein the potential at said point has the value
−(input voltage−((voltage drop across the diode)) V.

11. Circuit for the generation of an output voltage for use during active time periods but not during inactive time periods, the circuit comprising:

means for connecting a control voltage to the circuit, for switching between the active and the inactive time periods, means for connecting an input voltage to the circuit, a DC/DC-converter for converting the input voltage into the output voltage including a diode and a first transistor and storage means, wherein said storage means comprises a first condenser and is charged with a quantity of charge during the inactive time periods, for generating the output voltage during the active time periods, a current generator for generating a current, for generating the quantity of charge which charges said storage means, wherein the output voltage is obtained as the voltage at a point, between the first condenser and the diode, with respect to ground, wherein the potential at the point has the value
−(input voltage−((voltage drop across the diode))) V.

12. Use of the circuit according to claim 11, in a radio transmitter comprised in a portable radio equipment, where the radio equipment is used in a radio system where the transmissions occur in bursts, wherein the output voltage is used as the supply voltage to the power amplifier of the radio transmitter.

* * * * *